United States Patent
Chen et al.

(10) Patent No.: US 9,033,521 B2
(45) Date of Patent: May 19, 2015

(54) PROJECTION DEVICE AND METHOD FOR DECREASING STRAY LIGHT

(71) Applicant: Young Optics Inc., Hsinchu (TW)

(72) Inventors: Hui-Ping Chen, Hsinchu (TW); Cheng-Wei Tien, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 190 days.

(21) Appl. No.: 13/682,956

(22) Filed: Nov. 21, 2012

(65) Prior Publication Data

US 2014/0071405 A1    Mar. 13, 2014

(30) Foreign Application Priority Data

Sep. 13, 2012    (CN) .......................... 2012 1 0338793

(51) Int. Cl.
G03B 21/20 (2006.01)
H04N 9/31 (2006.01)
H04N 5/74 (2006.01)
G03B 21/00 (2006.01)

(52) U.S. Cl.
CPC ........... *H04N 9/3105* (2013.01); *H04N 5/7458* (2013.01); *G03B 21/2066* (2013.01); *G03B 21/208* (2013.01); *G03B 21/00* (2013.01); *H04N 9/3114* (2013.01); *H04N 9/3152* (2013.01)

(58) Field of Classification Search
CPC .. H04N 9/3105; H04N 9/3197; H04N 9/7441
USPC ......... 353/30, 31, 33, 37, 38, 85, 94, 99, 102; 348/743–747, 758, 771; 349/5, 7–9
See application file for complete search history.

(56) References Cited

U.S. PATENT DOCUMENTS

| | | | |
|---|---|---|---|
| 2003/0123163 A1* | 7/2003 | Penn | 359/833 |
| 2005/0018145 A1 | 1/2005 | Kwon et al. | |
| 2005/0185148 A1* | 8/2005 | Davis et al. | 353/84 |
| 2006/0092496 A1* | 5/2006 | Chen et al. | 359/292 |
| 2006/0290902 A1 | 12/2006 | Lin et al. | |
| 2010/0189344 A1* | 7/2010 | Maes | 382/162 |
| 2013/0003029 A1* | 1/2013 | Laidig | 355/53 |

FOREIGN PATENT DOCUMENTS

| | | |
|---|---|---|
| CN | 1577061 A | 2/2005 |
| CN | 1588227 A | 3/2005 |
| JP | 2007233004 A | 9/2007 |
| JP | 4019076 B2 | 12/2007 |

OTHER PUBLICATIONS

Chinese Office Action to Chinese Application No. 201210338793.9 dated Feb. 16, 2015.

* cited by examiner

*Primary Examiner* — Sultan Chowdhury
(74) *Attorney, Agent, or Firm* — Novak Druce Connolly Bove + Quigg LLP

(57) ABSTRACT

A projection device having an image beam and an off-state light is provided, which includes a camera module, a condensing element, a digital micromirror device (DMD) and a shading element, wherein the DMD allows the image beam to enter the camera module, and the shading element is configured between the DMD and the condensing element to block the off-state light.

20 Claims, 9 Drawing Sheets

PROJECTION DEVICE AND METHOD FOR DECREASING STRAY LIGHT

CROSS REFERENCE TO RELATED APPLICATIONS

This application claims benefit under 35 U.S.C. §119 of CN Application No. 201210338793.9, filed Sep. 13, 2012, the contents of which are incorporated by reference as if fully set forth.

FIELD OF THE INVENTION

The present invention relates to a field of projection device, in particular a projection device and a method for decreasing the projection stray lights by the moduled mechanical parts.

BACKGROUND OF THE INVENTION

The Digital Light Processing (DLP) projector is a projection display having a special light source modulation, which is a new projection system developed by the Texas Instruments (TI). The most important character that the DLP projector has is that it is a full digital reflective projector, which not only projects a finer image but also efficiently reduces the size and the weight of the projector. Since the DLP projector has a simple structure, it is more advantageous in the development of the micro projector.

The miniaturization of the projector should start from the optical system, in which the light source and the optical engine have to be miniaturized, the optical path is reduced thereby, and the panel and the optical element also need to match the reduced size. It is an important issue in the miniaturization of the projector to achieve the miniaturization of the projector and to suppress the noise.

The DLP™ technology is operated based on a micro electrical mechanical element, i.e. the digital micromirror device (DMD) chip. The DMD chip has three layers including an optical micromirror layer at the top, a mechanical supporting layer at the middle and an electronic controlling layer around at the bottom. The optical micromirror layer is a two-dimension array composed of individually controlled micromirrors, each of which micromirror is supported by a yoke joined with a series of torsion hinges and arranged in the mechanical supporting layer, and the micromirror is controlled by a corresponding underlying static random access memory (SRAM) cell in the electronic controlling layer. Each micromirror represents one pixel of an imaged to be projected in the projection screen. The micromirrors on the DMD microchip may receive the data word line represented by the electrical signal and generate the optical word line output.

The structure of the optical system of the DLP projector is shown in FIG. 1, wherein the optical system consists of a light source 10, a color wheel 12, an integrator 14, a condenser 16, a reflective mirror 18, a digital micromirror device (DMD) 20 and a camera lens 22. As shown in FIG. 1, the camera lens 22 is assembled by a plurality of lens. The beams generated from the light source 10 is collected by a concave mask, pass through the color wheel 12 to be the light with different colors, unified by the integrator 14, condensed by the condenser 16 to enter the reflective mirror 18, and then incident to the DMD 20. The DMD 20 digitally process an image to be associated with the incident lights and reflects the lights to the camera lens 22, thereby the lights entering the camera lens 22 are projected on the screen 24.

By deflecting of the micromirrors on the DMD, the incident light may be reflected at different angles and the bright and dark effects of the light spots are achieved. Generally, the rotation angle of the DMD ranges between +10 to −10 degree. When receiving an On state signal, the micromirrors in the DMD rotate about +10 degrees to make the reflected light enter the camera and being projected on the screen so as to form an On state light spot. While the DMD receives an Off state signal, the micromirrors in the DMD rotate about −10 degrees to make the reflected light enter the range outside the camera and do not generate light spot on the screen, i.e. the Off-state. Besides, the reflected light is in a flat state if the DMD does not rotate or rotates at 0 degree. Referring to FIG. 1, when the light 26a becomes the light 26b via the rotation of the DMD 20 and enters into the camera lens 22, the light is projected to the effective area of the screen 24. However, when the DMD 20 rotates with a specific angle and reflects the light 28a to be light 28b, the light 28b does not enter the camera lens 22 but forms an ineffective area outside the screen 24.

The smaller the size of the projector is, the closer the condenser approaches the DMD. At this time, most of the off state light and the flat state light would be reflected by the condenser. In FIG. 1, the light 28b is reflected by the condensing element 16 to become the light 28c, and the light 28c causes a serious stray light outside the screen after it passes through the camera. The stray light is a reflection phenomenon, which forms a bright area at the ineffective area outside the screen and affects the image quality of the projection. For resolving the problem caused by this stray light, one solution is extinction of the surrounding elements of the DMD to decrease the strong reflection by increasing the roughness of the surfaces of the elements. The extinction merely makes the surrounding of the DMD darker but cannot eliminate the reflection completely. Another solution is to enhance the flatness of the mirror surface of the DMD for decreasing the unnecessary stray light greatly, but it results in a higher cost. A further solution is to compose a baffle around the DMD to block the light, such a baffle still cannot eliminate the reflection completely because the stray light is still projected to the surrounding of the DMD. Moreover, the baffle is required to be assembled additionally and thus increases the complexity of the system assembly.

In view of the drawbacks of the prior art, it is a need to provide a projection device which has an easy assembly design and a low cost for decreasing the stray light phenomenon under the existing DLP structure. The summary of the present invention is described below.

SUMMARY OF THE INVENTION

The major purpose of the present invention is to decrease the stray light in projection by using the shading element to block the off state light and the flat state light in projection.

In the present invention, a projection device having an image beam and an off-state light includes: a light source configured to emit a light beam; a color filter configured to enable the light beam to pass therethrough; an integrator configured to unify the light beam after the light beam passes through the color filter; a camera module; a condensing element configured to condense the light beam after the light beam is unified by the integrator; an image beam providing device configured to receive the condensed light beam and provide the image beam to enter the camera module; and a first shading element being not located in a path of the image beam to enter the camera module and configured at one of a first position between the camera module and the condensing element, and a second position between the image beam providing device and the condensing element to block the off-state light.

Preferably, the image beam providing device has a micro-mirror array including a plurality of micromirrors to be rotated upon receiving the condensed light beam so that the image beam is switched as the off-state light.

According to the present invention, the shading element and the condensing element are formed in one-piece. The shading element is not required to be assembled additionally and can be utilized in various projection structures such as the total internal reflection (TIR) structure, the reverse total internal reflection (RTIR) structure, the mirror type structure and the field lens structure.

In the present invention, another projection device having an image beam and an off-state light is provided, including: a camera module; an image beam providing device configured to receive a light beam and provide the image beam to enter the camera module; and a first shading element being not located in a path of the image beam to enter the camera module and configured between the camera module and the image beam providing device to block the off-state light.

In the preferred embodiments of the present invention, multiple projection devices having a single shading element or a plurality shading elements are provided. In one embodiment, a single shading element is configured between the condensing element and the image beam providing device while a single shading element is configured between the condensing element and the camera module in another embodiment. Additionally, the projection devices having a plurality of shading elements in the present invention include the symmetry and asymmetry configurations. All of the various configurations in the present invention as described above can efficiently block the off state light and the flat state light from the image beam providing device.

In the present invention, a manufacturing method of a projection device having an image beam and an off-state light is provided, wherein the projection device includes a camera module, an image beam providing device and a first shading element, and the image beam is outputted from the image beam providing device and projected out of the camera module. The manufacturing method includes: configuring the first shading element at a first position between the camera module and the image beam providing device to block the off-state light, wherein the image beam has a first path between the image beam providing device and the camera module, the off-state light has a second path between the image beam providing device and the first shading element, and either one of the first path and the second path is free of having an optical medium. The image beam providing device may rotate in different angles to switch the image beam as a flat-state light that also causes the stray light in projection. In the method of the present invention, the flat-state light is also blocked by the first shading element.

The projection device in the present invention not only blocks the off-state light generated by the image beam providing device but also blocks the flat-state light generated by the image beam providing device by configuring a shading element between the condensing element and the image beam providing device or between the camera module and the image beam providing device, to solve the problem of the stray light outside the projection screen. Particularly, the design of the present invention is more advantageous when the size of the projection device is reduced. Besides, the shading element and the condensing element of the present invention are formed in one-piece, so that the assembly is relative easy and the manufacturing cost can be saved.

Other objects, advantages and efficacies of the present invention will be described in detail below taken from the preferred embodiments with reference to the accompanying drawings, in which:

BRIEF DESCRIPTION OF THE DRAWINGS

FIG. 5(*b*) is a schematic diagram illustrating the combination of the mechanical part, the shading element and the condenser in FIG. 4.

FIG. 8(*b*) is a stray light picture of the flat-state light of a conventional projection device.

FIG. 8(*c*) is the projection effect of the screen of a conventional projection device.

FIG. 9(*b*) is a stray light picture of the flat-state light of the projection device of the present invention.

FIG. 9(*c*) is the projection effect of the screen of the projection device of the present invention.

DETAILED DESCRIPTION OF THE PREFERRED EMBODIMENTS

Figure 1:
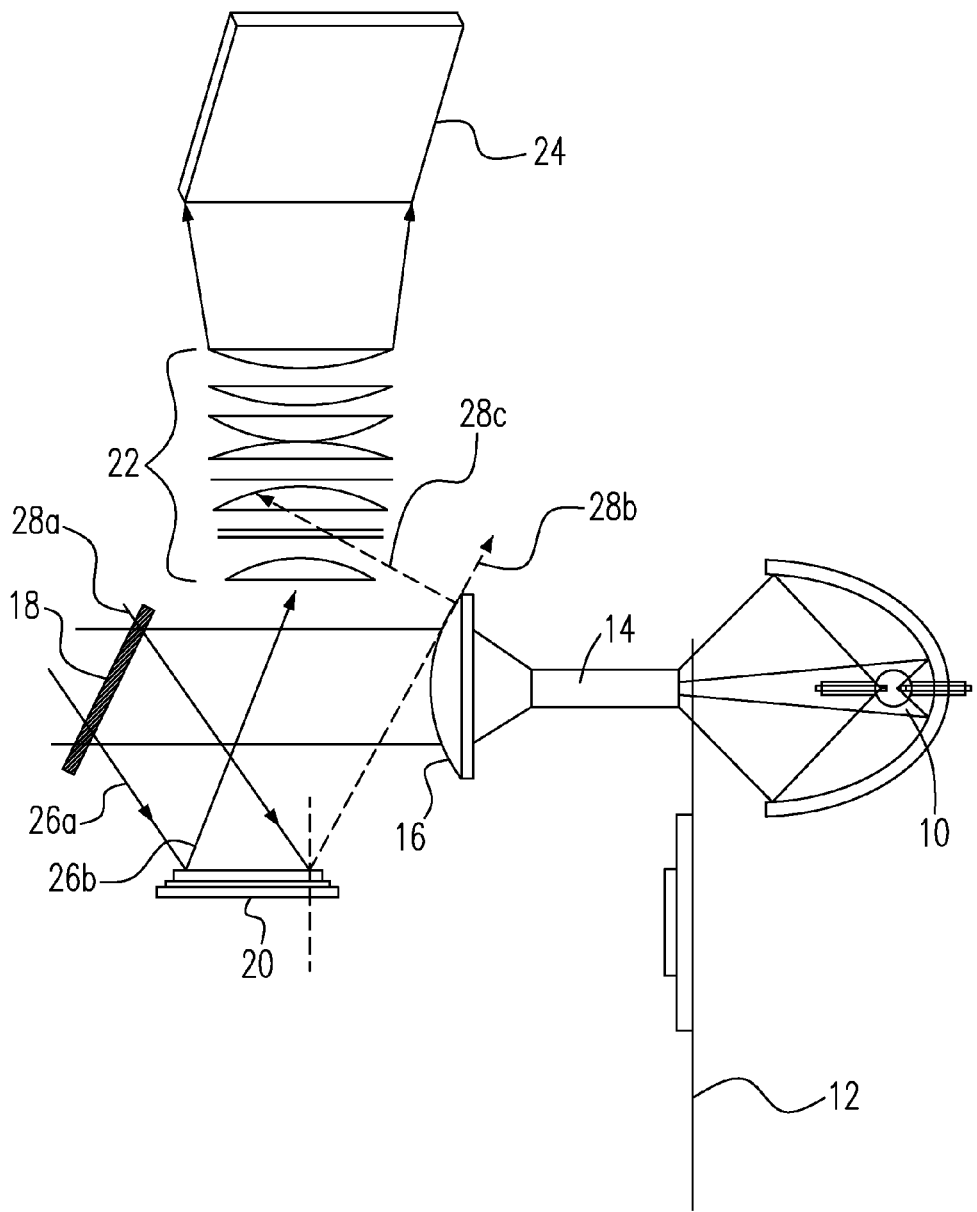
FIG. 1 is a schematic diagram illustrating the optical system structure of a DLP projector.

The present invention will now be described more specifically with reference to the following Embodiments. It is to be noted that the following descriptions of preferred Embodiments of this invention are presented herein for purpose of illustration and description only; it is not intended to be exhaustive or to be limited to the precise form disclosed. In the preferred embodiments, the same reference numeral represents the same element in each embodiment, and the apostrophe symbol (') represents the similar element in different embodiments.

Figure 2:
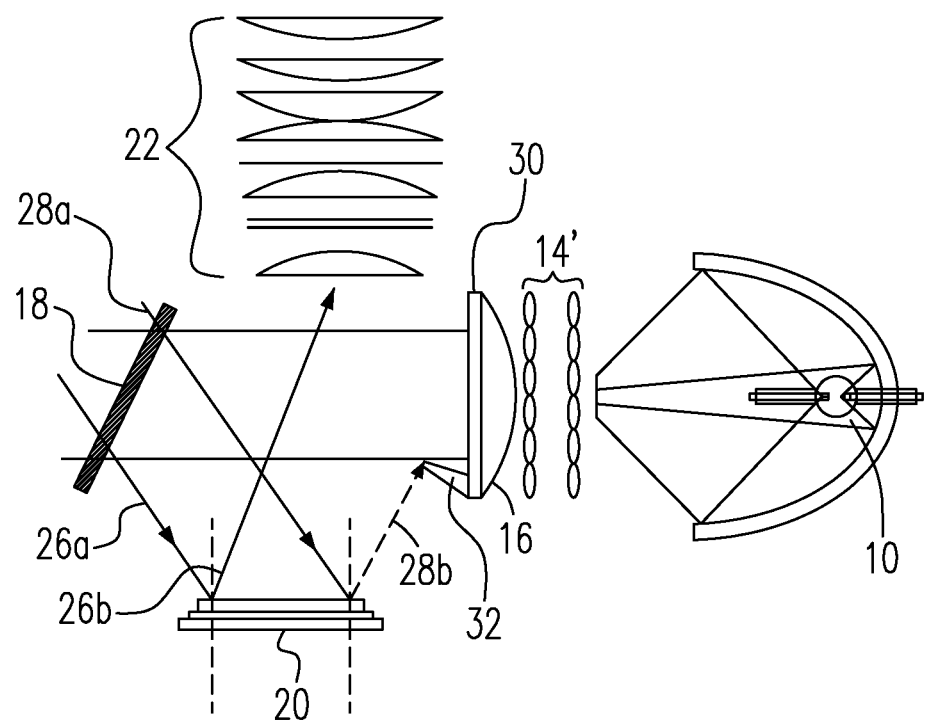
FIG. 2 is a schematic diagram illustrating the first embodiment of the projection device in the present invention.

Please refer to FIG. 2, which is a schematic diagram illustrating the first embodiment of the projection device in the present invention. The projection device has a basic optical engine structure similar to that in the general DLP projector and includes a light source 10, an integrator 14', a condenser 16, a reflective mirror 18, a DMD 20 and a camera lens 22. The light generated from the light source 10 is collected by a concave mask, unified by the integrator 14' and condensed by the condenser 16, and propagates to enter the reflective mirror 18, and then incident to the DMD 20. The DMD 20 digitally process an image to be associated with the incident lights and reflects the lights to the camera lens 22, thereby the lights entering the camera lens 22 are projected on the screen 24. In this text, the beam generated by the optical engine is also referred to as "the image beam". The DMD 20 has a micromirror array including a plurality of micromirrors and receives the light, and each piezoelectric controlled micromirror may rotate actively. Depending on the rotation angles, the light incident to the respective micromirror can become an off-state light or a flat-state light. The integrator 14' depicted in FIG. 2 is a lens array, but it is known for the skilled person that the integrator may be replaced by a rod integrator.

However, different from the conventional DLP projector, the projection device 10 of the present invention further includes a mechanical part 30 and the shading element 32 for blocking the off-state light and the flat-state light generated by the DMD 20. The mechanical part 30 and the shading element 32 are composed at the condenser 16 in one-piece on the side closer to the DMD 20, to allow the shading element 32 not only avoid the flat-state light but also the off-state light being reflected to the mirror surface of the condenser 16. Regarding the forming positions, the flat-state light is formed while the DMD 20 does not rotate and the off-state light is formed while the DMD 20 rotates −10 degrees, such that the off-state light deviates more from the entrance of the camera lens 22 than the flat-state light. The position of the shading element 32 of the present invention allows both of the flat-state light closing to the camera lens 22 and the off-state light apart from the camera lens 22 to be blocked in the projection device. The shading element in the present invention can efficiently decrease the stray light in relative to the shading element disposed on other positions (i.e. near the camera).

In the embodiment, the shading element 32 is an oblique barrier located in the condenser 16 on the side closing to the DMD 20. When the light 28a is reflected to become the light 28b, the light 28b is blocked by the shading element 32 and will not be projected outside the screen as the stray light. In addition to the form depicted in the drawings, the shading element 32 of the present invention can be any shape and will not influent the decreasing effect on the stray light. Meanwhile, in order to adapt to various projectors, the shading element 32 can be set as different sizes.

It is comprehended that the shading element 32 may also disposed between the condenser 16 and the camera lens 22 for blacking the off-state light and the flat-state light as well, although the shading element 32 is depicted as disposed between the condenser 16 and the DMD 20 in FIG. 2. The shading element in the projection device of the present invention can be utilized in various projector structures such as the total internal reflection (TIR) structure, the reverse total internal reflection (RTIR) structure, the mirror type structure and the field lens structure.

Figure 3:
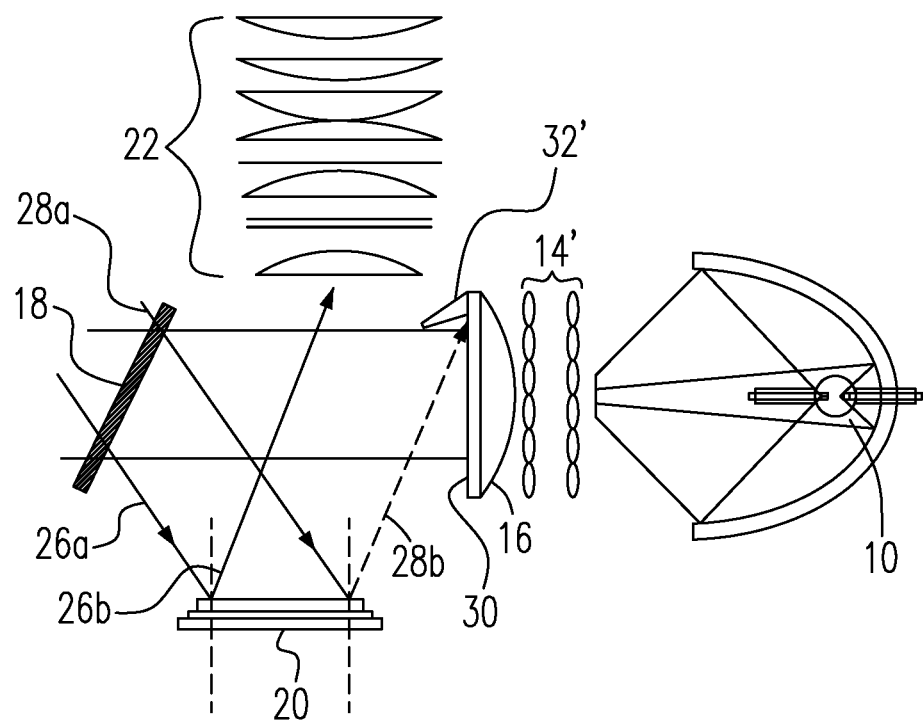
FIG. 3 is a schematic diagram illustrating the second embodiment of the projection device in the present invention.

FIG. 3 is a schematic diagram illustrating the second embodiment of the projection device in the present invention. The most elements of the projection device in FIG. 3 are similar to those in the first embodiment except the shading element 32'. In this embodiment, the shading element 32' is disposed between the condenser 16 and the camera lens 22, which is also an oblique barrier as the shading element 32 in FIG. 2 for blocking the flat-state light and the off-state light. When the light 28a is reflected by the DMD 20 to become the light 28b, the light 28b proceeds the position of the shading element 32' and being blocked by the shading element 32', such that the light 28b will not be projected outside the screen to form the stray light. Although the position of the shading element 32' in FIG. 3 is different from that of the shading element 32 in FIG. 2, the shading element 32' can block the flat-state light closing to the camera lens 22 and the off-state light apart from the camera lens 22 as well.

Figure 4:
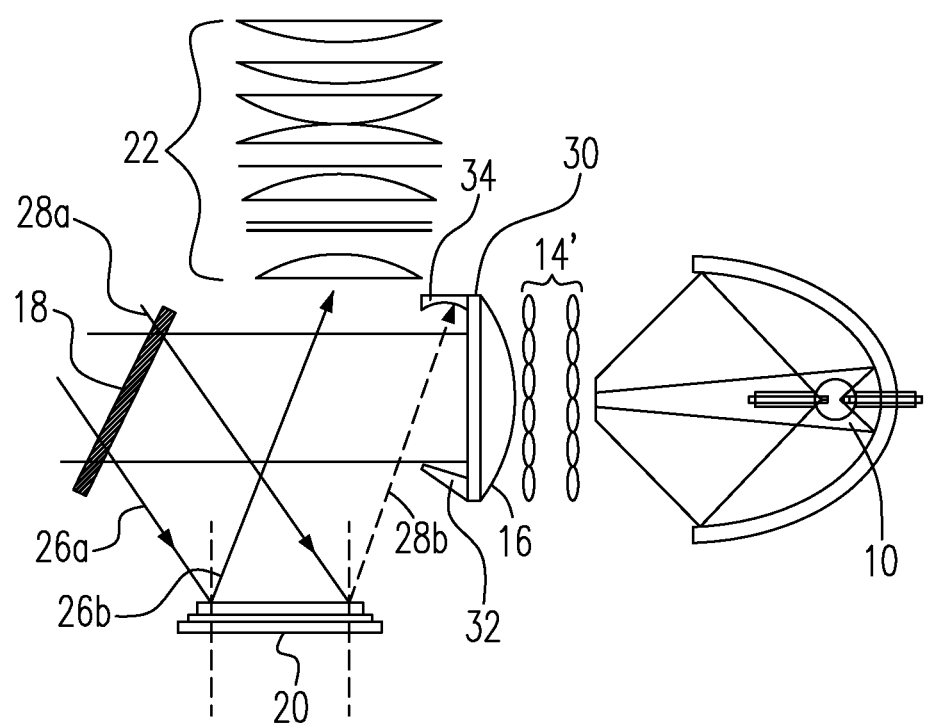
FIG. 4 is a schematic diagram illustrating the third embodiment of the projection device in the present invention.

FIG. 4 is a schematic diagram illustrating the third embodiment of the projection device in the present invention. There are two shading elements 32 and 34 in this embodiment, wherein the position of the shading element 32 is the same with that in FIG. 2 (i.e. between the condenser 16 and the DMD 20), and the position of the shading element 34 is the same with that of the shading element 32' in FIG. 3 (i.e. between the condenser 16 and the camera lens 22) whereas the shape thereof is different from that of the shading element 32' in FIG. 3. As the above descriptions regarding FIG. 3, both of the configuration positions of the shading elements 32 and 34 can block the flat-state light and the off-state light. As shown in FIG. 4, the shading elements 32 and 34 may have different shapes and will not influent the effect on blocking the off-state light and the flat-state light. For example, the shading element 32 may be an oblique barrier and the shading element 34 may be a concave barrier, or vise versa. The detail structure of the shading element of the present invention will be described in FIG. 5.

Figure 5A:
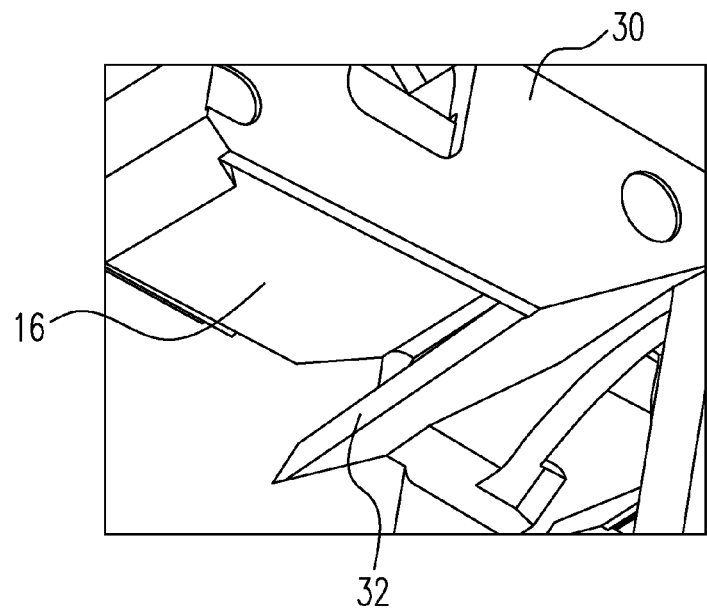
FIG. 5(*a*) is a schematic diagram illustrating the combination of the mechanical part, the shading element and the condenser in FIG. 2.
Figure 5B:
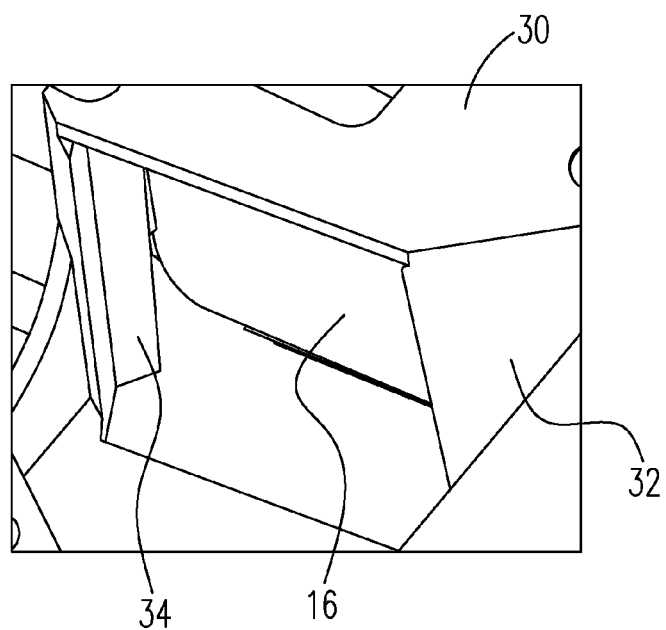

FIGS. 5(a) and 5(b) are schematic diagrams illustrating combination of the mechanical part(s), the shading element and the condenser in FIGS. 2 and 4, respectively. Please refer to FIG. 5(a), which corresponds to the first embodiment of the present invention and only shows the combination of the condenser 16, the mechanical part and the shading element. The structure at the central of the drawing is the condenser 16, the mechanical part 30 is disposed on the outside wall of the condenser 16, and the shading element 32 is connected to the mechanical part 30. As shown in the FIG. 5(a), the mechanical part 30 and the shading element 32 are assembled together with the condenser 16 to form a barrier outside the condenser 16. Such one-piece design can block the off-state light and the flat-state light reflected to the condenser 16 without additional assemble for the shading element. Specifically, on a condition that the limit on the size of the projector is broaden, it is sufficient to block the stray light in projection by disposing the shading element 32 on one side of the condenser 16. Continuing to refer to FIG. 5(b), which corresponds to the third embodiment of the present invention and only shows the combination of the condenser 16, the mechanical part and the shading elements. There are two shading elements 32 and 34 in this embodiment, wherein the shading element 32 is an oblique barrier and the shading element 34 is a concave barrier. In FIG. 5(b), the central structure is the condenser 16, the mechanical part 30 is disposed on the outside wall of the condenser 16, and the shading elements 32 and 34 are connected to both sides of the mechanical part 30. The mechanical part 30 and the shading elements 32 and 34 are assembled together with the condenser 16. Subject to a condition that the size of the projector is smaller, the shading elements 32 and 34 on both sides of the condenser 16 can efficiently block the off-state light and the flat-state light reflected to the mirror surface of the condenser 16.

Figure 6:
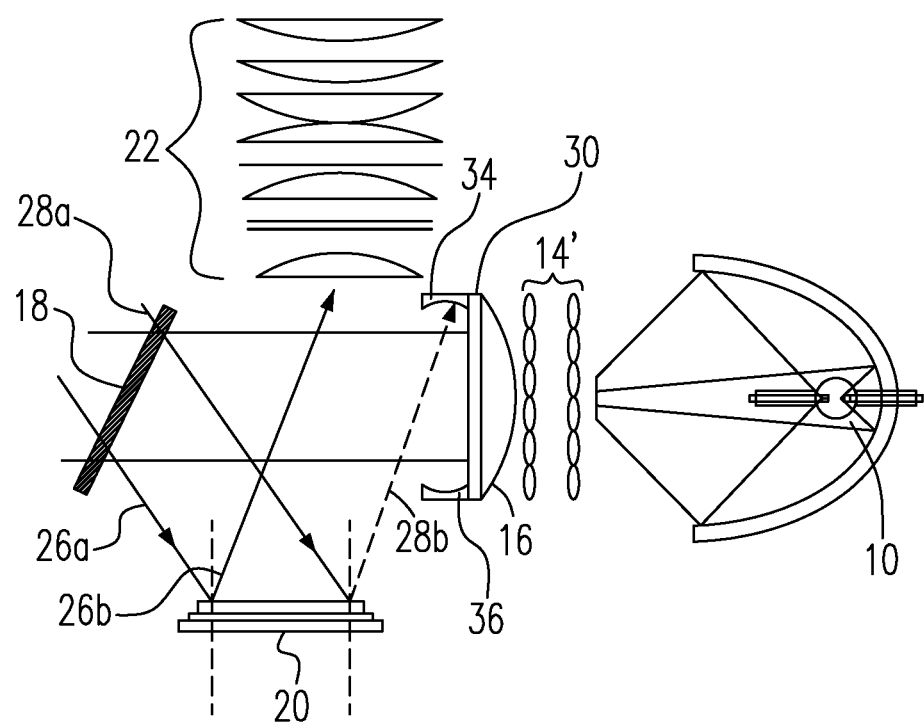
FIG. 6 is a schematic diagram illustrating the fourth embodiment of the projection device in the present invention.

FIG. 6 is a schematic diagram illustrating the fourth embodiment of the projection device in the present invention. There are two shading elements 34 and 36 in this embodiment, the positions of these two shading elements 34 and 36 are similar to those of the shading elements 34 and 32 in FIG. 4, i.e. the shading element 34 is configured between the condenser 16 and the camera lens 22, and the shading element 36 is configured between the condenser 16 and the DMD 20. However, the shading elements 34 and 36 have the same shape being concave barriers and are configured on the mechanical part 30 symmetrically. As the above descriptions regarding FIG. 3, both of the configuration positions of the shading element can block the flat-state light and the off-state light. On a condition that the size of the projector is smaller, the shading elements configured on these two positions simultaneously can block the off-state light and the flat-state light reflected to the mirror surface of the condenser 16 more efficiently.

Figure 7:
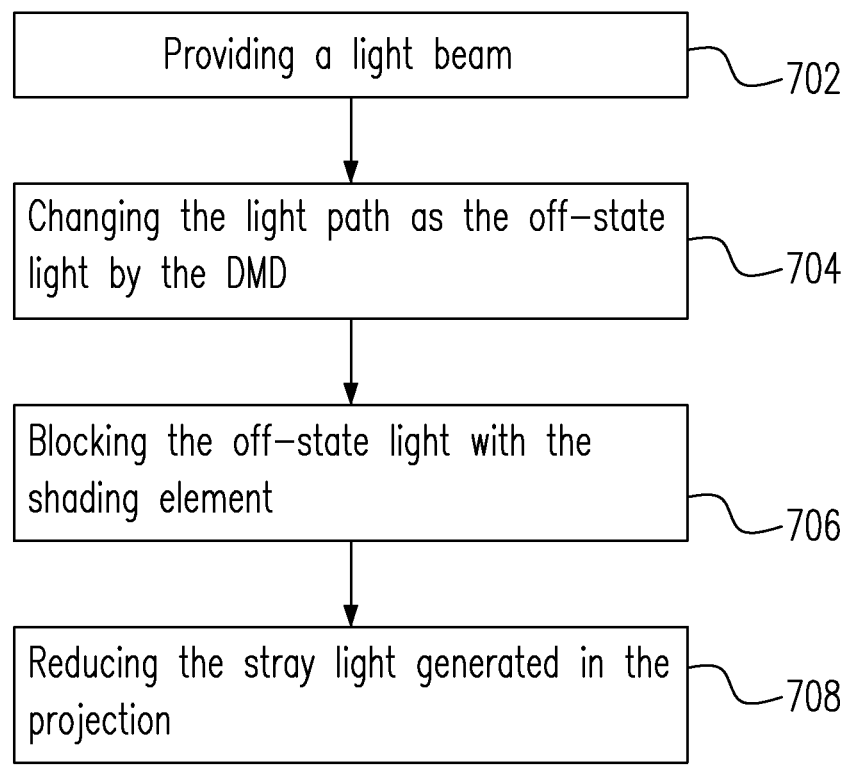
FIG. 7 is a flow chart illustrating the projection method of the present invention.

According to the projection device of the present invention, a method for decreasing the off-state light 700 is further provided, in which the stray light in projection may be efficiently decreased by the light source, the DMD, the camera module (i.e. the camera), the condensing element (i.e. the condenser) and the shading element of the projection device of the present invention. In FIG. 7, a light beam is provided at step 702 (by the light source), the light path is changed as the off-state light by the DMD at step 704, and a shading element is configured at one of a first position between the condensing element and the DMD, and a second position between the camera module and the condensing element to block the off-state light at step 706. Then, the stray light generated in the projection is reduced at step 708. In addition to the off-state light, the DMD can also switch the light beam as the flat-state light to cause the stray light in the projection. The shading element of the present invention can also block the flat-state light to reduce the stray light in the projection.

Figure 8A:
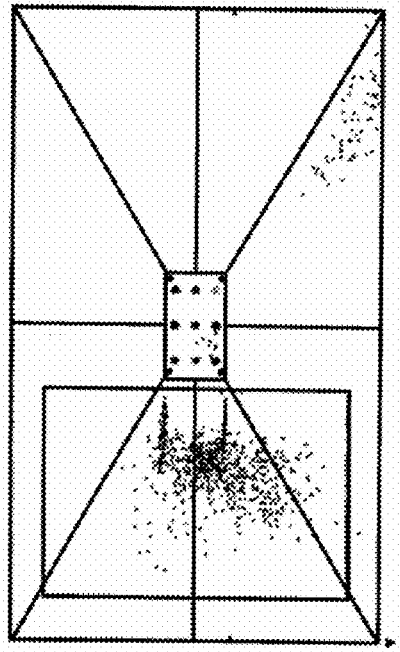
FIG. 8(*a*) is a stray light picture of the off-state light of a conventional projection device.
Figure 8B:
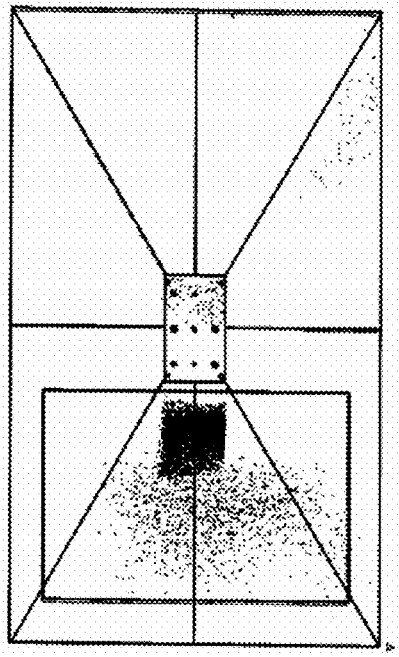
Figure 8C:
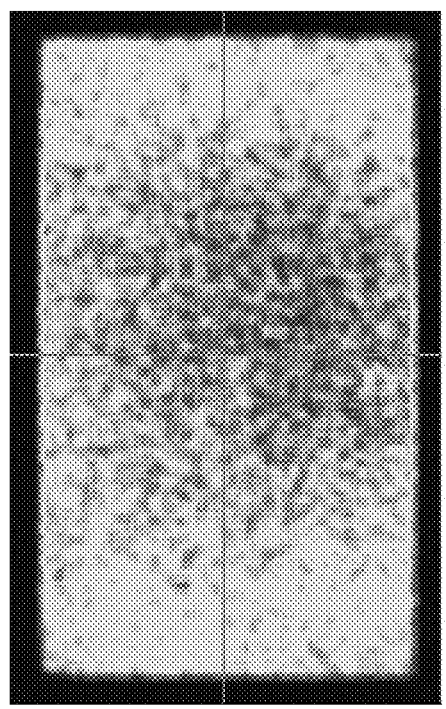
Figure 9A:
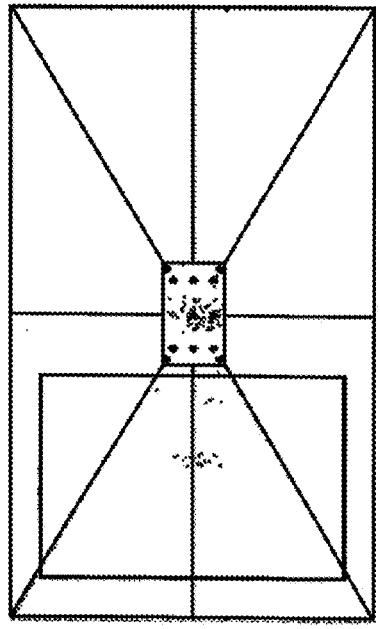
FIG. 9(*a*) is a stray light picture of the off-state light of the projection device of the present invention.
Figure 9B:
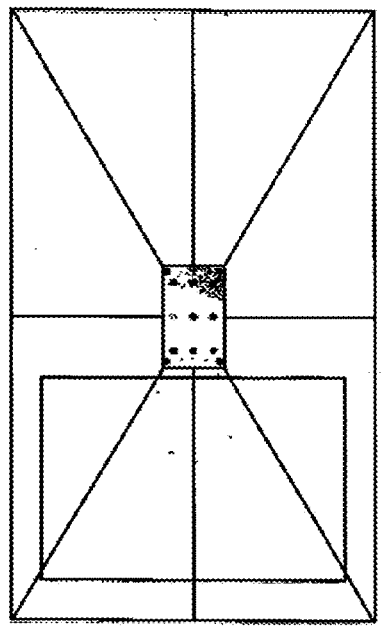
Figure 9C:
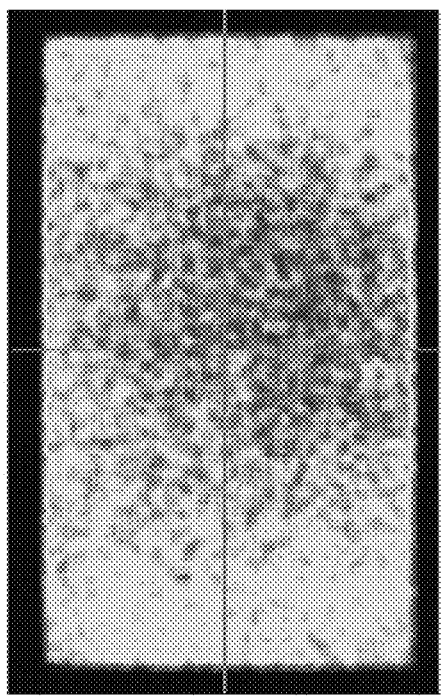

The comparisons of the projection device of the present invention with the conventional projection device are shown in FIGS. 8 and 9, wherein FIG. 8 shows the stray light picture and the projection effect of a conventional projection device, and FIG. 9 shows the stray light picture and the projection effect of the projection device of the present invention. FIGS. 8(*a*) and 8(*b*) show the stray light pictures of the off-state light and the flat-state light of the conventional projection device, respectively. The central rectangle is the screen and the dots outside the screen are referred to as the stray light. It can be seen that the off-state light and the flat-state light cause the stray light on the left side of the screen due to the reflection of the mirror surface of the condenser, without the design of the present invention. The effect of the stray light is simulated with the Advanced System Analysis Program (ASAP) to obtain the stray light efficiency of the off-state light (0.1609%) in FIG. 8(*a*) and the stray light efficiency of the flat-state light (1.6783%) in FIG. 8(*b*). Referring to FIG. 9, FIGS. 9(*a*) and 9(*b*) show the stray light pictures of the off-state light and the flat-state light of the projection device of the present invention, respectively. As compared with the conventional projection device, the projection device of the present invention generates less stray light, wherein the stray light efficiency of the off-state light in FIG. 9(*a*) 0.0028% and the stray light efficiency of the flat-state light in FIG. 9(*b*) is 0.0008%. FIGS. 8(*c*) and 9(*c*) show the projection effect of the screen of the conventional projection device and the projection device of the present invention, respectively, and it is found that the projection device of the present invention will not affect the projection efficiency and the uniformity on the screen due to the reduced stray light.

For complying with the trend of reducing the size of the projector, the distance between the internal elements of the projector must be reduced and thus the problem of the stray light is even more serious. The projection device of the present invention can reduce the stray light on the screen and maintain the miniaturized design at the same time.

Although the present invention has been described with reference to certain exemplary embodiments thereof, it would be understood by those skilled in the art that a variety of modifications and variations may be made to the present invention without departing from the spirit or scope of the present invention defined in the appended claims, and their equivalents.

Embodiments

1. A projection device having an image beam and an off-state light, includes: a light source configured to emit a light beam; a color filter configured to enable the light beam to pass therethrough; an integrator configured to unify the light beam after the light beam passes through the color filter; a camera module; a condensing element configured to condense the light beam after the light beam is unified by the integrator; an image beam providing device configured to receive the condensed light beam and provide the image beam to enter the camera module; and a first shading element being not located in a path of the image beam to enter the camera module and configured at one of a first position between the camera module and the condensing element, and a second position between the image beam providing device and the condensing element to block the off-state light.

2. According to the above embodiment, the image beam providing device has a micromirror array including a plurality of micromirrors to be rotated upon receiving the condensed light beam so that the image beam is switched as the off-state light.

3. According to the above embodiments, the projection device further includes a reflective mirror configured to reflect the condensed light beam to the image beam providing device.

4. According to the above embodiments, the projection device further includes a second shading element being not located in the path of the image beam to enter the camera module and configured at the other of the first position and the second position that is free from situating the original shading element to block the off-state light.

5. According to the above embodiments, each of the first shading element and the second shading element is selected from an oblique barrier and a concave barrier.

6. According to the above embodiments, wherein the first shading element and the second shading element have respective shapes different from each other.

7. According to the above embodiments, wherein the first shading element and the second shading element have the same shape.

8. According to the above embodiments, wherein the first shading element and the condensing element are connected.

9. According to the above embodiments, wherein the projection device has a structure being one selected from a group consisting of a total internal reflection (TIR) structure, a reverse total internal reflection (RTIR) structure, a mirror type structure and a field lens structure.

10. A projection device having an image beam and an off-state light, includes: a camera module; an image beam providing device configured to receive a light beam and provide the image beam to enter the camera module; and a first shading element being not located in a path of the image beam to enter the camera module and configured between the camera module and the image beam providing device to block the off-state light.

11. According to the above embodiment, the projection device further includes a light source, a color filter, an integrator and a condensing element, wherein the light beam is emitted from the light source, passes through the color filter, the integrator and the condensing element to the image beam providing device, and the image beam providing device has a micromirror array including a plurality of micromirrors to be rotated upon receiving the condensed light beam so that the image beam is switched as the off-state light.

12. According to the above embodiments, the projection device further includes a second shading element disposed between the condensing element and the image beam providing device.

13. According to the above embodiments, both of the first shading element and the second shading element are configured to block the off-state light.

14. According to the above embodiments, the first shading element and the second shading element have respective shapes different from each other.

15. According to the above embodiments, the first shading element and the second shading element have the same shape.

16. According to the above embodiments, the first shading element and the condensing element are connected.

17. According to the above embodiments, wherein the projection device has a structure being one selected from a group consisting of a total internal reflection (TIR) structure, a reverse total internal reflection (RTIR) structure, a mirror type structure and a field lens structure.

18. A manufacturing method of a projection device having an image beam and an off-state light is provided, wherein the projection device includes a camera module, an image beam providing device and a first shading element, and the image beam is outputted from the image beam providing device and projected out of the camera module. The manufacturing method includes: configuring the first shading element at a first position between the camera module and the image beam providing device to block the off-state light, wherein the image beam has a first path between the image beam providing device and the camera module, the off-state light has a second path between the image beam providing device and the first shading element, and either one of the first path and the second path is free of having an optical medium.

19. According to the above embodiment, the projection device further includes a second shading element configured at a second position between the camera module and the image beam providing device to block the off-state light.

20. According to the above embodiments, the projection device further includes a condensing element and a mechanical part, and the manufacturing method further includes a step of assembling the mechanical part and the first shading element together with the condensing element and assembling the mechanical part and the second shading element together with the condensing element.

What is claimed is:

1. A projection device having an image beam and an off-state light, comprising:
   a light source configured to emit a light beam;
   a color filter configured to enable the light beam to pass therethrough;
   an integrator configured to unify the light beam after the light beam passes through the color filter;
   a camera module;
   a condensing element configured to condense the light beam after the light beam is unified by the integrator;
   an image beam providing device configured to receive the condensed light beam and provide the image beam to enter the camera module; and
   a first shading element being not located in a path of the image beam to enter the camera module and configured at one of a first position between the camera module and the condensing element, and a second position between the image beam providing device and the condensing element to block the off-state light.

2. The projection device as claimed in claim 1, wherein the image beam providing device has a micromirror array including a plurality of micromirrors to be rotated upon receiving the condensed light beam so the image beam is switched as the off-state light.

3. The projection device as claimed in claim 2, further comprising a reflective mirror configured to reflect the condensed light beam to the image beam providing device.

4. The projection device as claimed in claim 1, further comprising a second shading element being not located in the path of the image beam to enter the camera module and configured at the other of the first position and the second position that is free from situating the first shading element to block the off-state light.

5. The projection device as claimed in claim 4, wherein each of the first shading element and the second shading element is selected from an oblique barrier and a concave barrier.

6. The projection device as claimed in claim 5, wherein the first shading element and the second shading element have respective shapes different from each other.

7. The projection device as claimed in claim 5, wherein the first shading element and the second shading element have the same shape.

8. The projection device as claimed in claim 1, wherein the first shading element and the condensing element are connected.

9. The projection device as claimed in claim 1, wherein the projection device has a structure being one selected from the group consisting of a total internal reflection (TIR) structure, a reverse total internal reflection (RTIR) structure, a mirror type structure and a field lens structure.

10. A projection device having an image beam and an off-state light, comprising: a camera module; an image beam providing device configured to receive a light beam and provide the image beam to enter the camera module; and a first shading element being not located in a path of the image beam to enter the camera module and configured at one of a first position between the camera module and a condensing element, and a second position between the image beam providing device and the condensing element to block the off-state light.

11. The projection device as claimed in claim 10, further comprising a light source, a color filter, an integrator and a condensing element, wherein the light beam is emitted from the light source, passes through the color filter, the integrator and the condensing element to the image beam providing device, and the image beam providing device has a micromirror array including a plurality of micromirrors to be rotated upon receiving the condensed light beam so that the image beam is switched as the off-state light.

12. The projection device as claimed in claim 11, further comprising a second shading element disposed between the condensing element and the image beam providing device.

13. The projection device as claimed in claim 12, wherein both of the first shading element and the second shading element are configured to block the off-state light.

14. The projection device as claimed in claim 12, wherein the first shading element and the second shading element have respective shapes different from each other.

15. The projection device as claimed in claim 12, wherein the first shading element and the second shading element have the same shape.

16. The projection device as claimed in claim 11, wherein the first shading element and the condensing element are connected.

17. The projection device as claimed in claim 10, wherein the projection device has a structure being one selected from the group consisting of a total internal reflection (TIR) structure, a reverse total internal reflection (RTIR) structure, a mirror type structure and a field lens structure.

18. A manufacturing method of a projection device having an image beam and an off-state light, wherein the projection device comprises a camera module, an image beam providing device and a first shading element, and the image beam is outputted from the image beam providing device and projected out of the camera module, the manufacturing method comprising:

configuring the first shading element at a first position between the camera module and the image beam providing device to block the off-state light, wherein the image beam has a first path between the image beam providing device and the camera module, the off-state light has a second path between the image beam providing device and the first shading element, and either one of the first path and the second path is free of having an optical medium.

19. The manufacturing method as claimed in claim 18, wherein the projection device further comprises a second shading element configured at a second position between the camera module and the image beam providing device to block the off-state light.

20. The manufacturing method as claimed in claim 19, wherein the projection device further comprises a condensing element and a mechanical part, and the manufacturing method further comprises a step of assembling the mechanical part and the first shading element together with the condensing element and assembling the mechanical part and the second shading element together with the condensing element.

* * * * *